United States Patent [19]

Wada et al.

[11] Patent Number: 5,201,040
[45] Date of Patent: Apr. 6, 1993

[54] MULTIPROCESSOR SYSTEM HAVING SUBSYSTEMS WHICH ARE LOOSELY COUPLED THROUGH A RANDOM ACCESS STORAGE AND WHICH EACH INCLUDE A TIGHTLY COUPLED MULTIPROCESSOR

[75] Inventors: Kenichi Wada, Sagamihara; Akira Yamaoka, Hachiouji, both of Japan

[73] Assignee: Hitachi, Ltd., Tokyo, Japan

[21] Appl. No.: 209,073

[22] Filed: Jun. 20, 1988

[30] Foreign Application Priority Data

Jun. 22, 1987 [JP] Japan .................. 62-153281

[51] Int. Cl.⁵ ........................................... G06F 12/08
[52] U.S. Cl. ................... 395/400; 364/243.1; 364/243.5; 364/229; 364/260; 364/DIG. 1
[58] Field of Search ... 364/200 MS File, 900 MS File; 395/400, 425

[56] References Cited

U.S. PATENT DOCUMENTS

| | | |
|---|---|---|
| 3,800,286 | 3/1974 | Brown .................. 364/200 |
| 4,212,057 | 7/1980 | Devlin .................. 364/200 |
| 4,240,143 | 12/1980 | Besemer ............... 364/200 |
| 4,399,504 | 8/1983 | Obermarck .......... 364/200 |
| 4,443,849 | 4/1984 | Ohwada ............... 364/200 |
| 4,445,176 | 4/1984 | Burk ..................... 364/200 |
| 4,484,275 | 11/1984 | Katzman ............... 364/200 |
| 4,547,849 | 10/1985 | Louie ................... 364/200 |
| 4,590,554 | 5/1986 | Glazer .................. 364/200 |
| 4,622,631 | 11/1986 | Frank ................... 364/200 |
| 4,709,325 | 11/1987 | Yajima ................. 364/200 |
| 4,814,970 | 3/1989 | Barbagelata ......... 364/200 |
| 4,881,164 | 11/1989 | Hailpern .............. 364/200 |
| 4,945,470 | 7/1990 | Takahashi ............ 364/200 |

FOREIGN PATENT DOCUMENTS 589276 1/1983 Japan .

OTHER PUBLICATIONS

33rd National Convention Record of Information Processing Society (1989).
Computer Architecture and Parallel Processing, Chpt. 7, Multiprocessor Architecture and Programming pp. 459-463.

Primary Examiner—Thomas C. Lee
Assistant Examiner—Eric Coleman
Attorney, Agent, or Firm—Antonelli, Terry, Stout & Kraus

[57] ABSTRACT

A data processing system which has a plurality of sets of sub-systems, with each set including: a plurality of processors; a main storage; and a controller for controlling the transfer between at least each of the processors and the main storage. A shared storage apparatus is shared between the sub-systems to store exclusive control information, information on the processor-to-processor communications and an instruction to be transferred between the main storages and the shared storage apparatus when the information is accessed by each sub-system. The instruction designates a main storage address, a transfer data length and specified information on accessing the location of the shared storage apparatus and is decoded by the processors to that the main storage address is transferred to the main storage, whereas the specified information such as a data identifier and a relative address is transferred to the shared storage apparatus.

20 Claims, 7 Drawing Sheets

FIG. 6
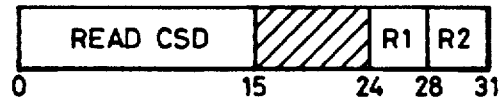
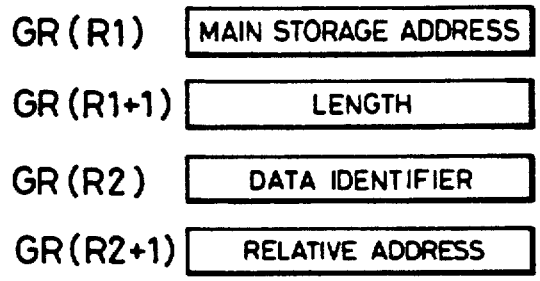
FIG. 7
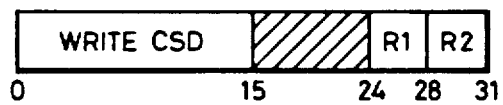
FIG. 8
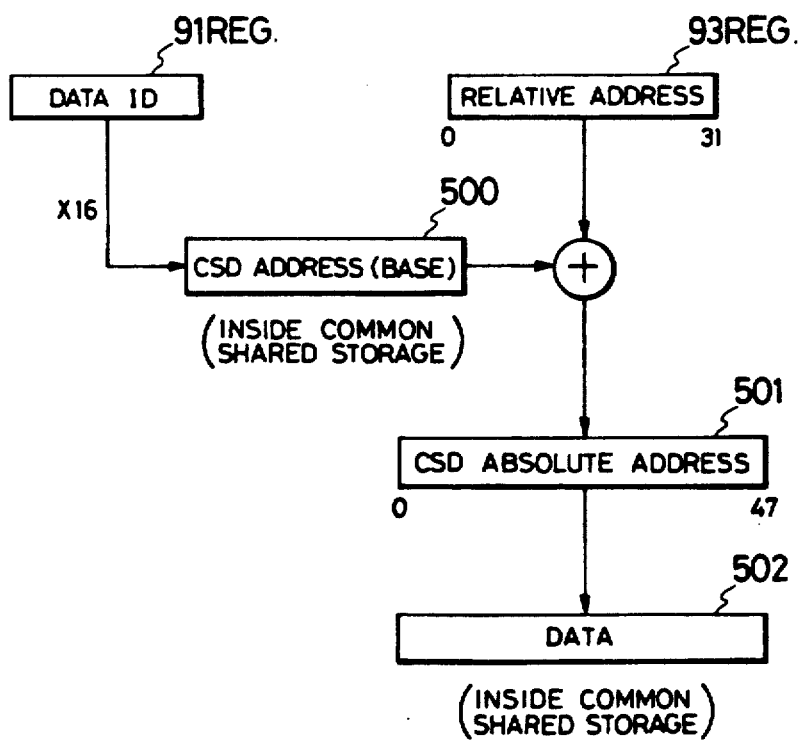

MULTIPROCESSOR SYSTEM HAVING SUBSYSTEMS WHICH ARE LOOSELY COUPLED THROUGH A RANDOM ACCESS STORAGE AND WHICH EACH INCLUDE A TIGHTLY COUPLED MULTIPROCESSOR

BACKGROUND OF THE INVENTION

1. Field of the Invention

The present invention relates to a loosely coupled multi-processor system and, more particularly, to a high-speed system for the exclusive shared among systems.

2. Description of the Prior Art

Tightly coupled multi-processors and loosely coupled multi-processors are frequently used as a system for coupling a plurality of processors. The former are characterized in that a main storage is shared among the processors and controlled by one OS (Operating System), and the latter are characterized in that the processors are equipped with independent main storages (i.e., not shared) under independent OSes and coupled through a shared input/output unit called DASD (Direct Access Storage Device). This input/output unit is composed of a sequential access memory such as a disk device.

The latter systems of the prior art are discussed on pp. 459 to 462. "Computer Architecture and Parallel Processing" of Mc Graw-Hill Book Company By K. Hwang, F. A. Briggs and on pp. 154 to 173, "Multiple Virtual Storage Operating System" of Ohm Kabushiki Kaisha by Hajime Kamata, 1983.

FIG. 2 shows the structure of one example of such loosely coupled multi-processor system. In FIG. 2: reference numerals 1 to 4 designated instruction processors #1, #2, #3 and #4; numerals 5 and 6 system controllers #1 and #2; numerals 7 and 9 main storages; and numerals 8 and 10 input/output processors. Numerals 11A and 11C designate non-shared input/output units; numeral 11B a shared DASD; and numeral 90 a channel-to-channel adaptor (CTCA). The instruction processors #1 and #2 have a tightly coupled multi-processor structure having the main storage 7 and the input/output processor 8 connected to the processors #1 and #2 through the system controller #1. Likewise, the instruction processor #3 and #4 employ a tightly coupled multi-processor structure having the main storage 9 and the input/output processor 10 connected to the processors #3 and #4 through the system controller #2. Each sub-system composed of the two instruction processors, the system controller, the main storage, the input/output processor and the non-shared input/output unit is called a "processor sub-system". In FIG. 2, these two processor sub-systems constitute together the loosely coupled multi-processor system coupled through the CTCA 90 and the shared DASD 11B.

An exclusive control is necessary for controlling the input/output unit 11B shared in the system. In case each processor (e.g., #1) updates the content of the shared input/output unit 11B, it requests, in advance, another processor sub-system, to give permission to use the shared unit 11B through the system controller (e.g., #1), the input/output processor (e.g., 8) and CTCA 90. The requested processor sub-system gives the permission through the CTCA 90 if it is not using the shared unit 11B. The same sub-system does not give permission if it is using the shared DASD 11B. With the permission, the process # subsequently accesses the shared input/output unit 11B. Otherwise, this access is inhibited until the requested processor sub-system informs the process #1 of the end of use of the shared input/output unit 11B through the CTCA 90. Thus, the exclusive control of the shared input/output unit 11B is accomplished through the CTCA.

This CTCA is also used for the communications between the processor sub-systems.

In the prior art thus far described, an access is made through the CTCA in the case of using the shared input/output unit and for the communications between the processor sub-systems. The CTCA is one of the input/output units and requires a channel (input/output) program. The operation of the channel program requires execution of a start I/O instruction. This start I/O instruction is accompanied by the execution of an ordinary type preparatory system control program so that many instructions have to be processes by an instruction processor.

SUMMARY OF THE INVENTION

An object of the present invention is to provide a high-speed access system in case the shared input/output unit is used.

According to the present invention, therefore, there is provided a data processing system which comprises:

(a) a plurality of subsystems, each including:
(11) a main storage;
(12) at least one instruction execution means connected to said main storage for executing instructions;

(b) shared storage comprised of a random access memory and for holding groups of data shared by the subsystems;

(c) access means connected to respective instruction execution means of a respective sub-system and responsive to execution by one of the sub-systems, of an instruction requiring an access to said shared storage for reading from or writing into said shared storage, at least one data within one data group among the data groups in response to a data ID indicated by the instruction, indicative of the one data group and to a relative address within the one data group designated by the instruction, for the one data.

BRIEF DESCRIPTION OF THE DRAWINGS

FIGS. 6 and 7 are diagrams showing instructions to be transferred between a main storage and a shared storage apparatus;

FIG. 8 is a diagram for illustrating how a shared storage address is to be produced from a file identifier and a relative address.

DETAILED DESCRIPTION OF THE PREFERRED EMBODIMENTS

Figure 1:
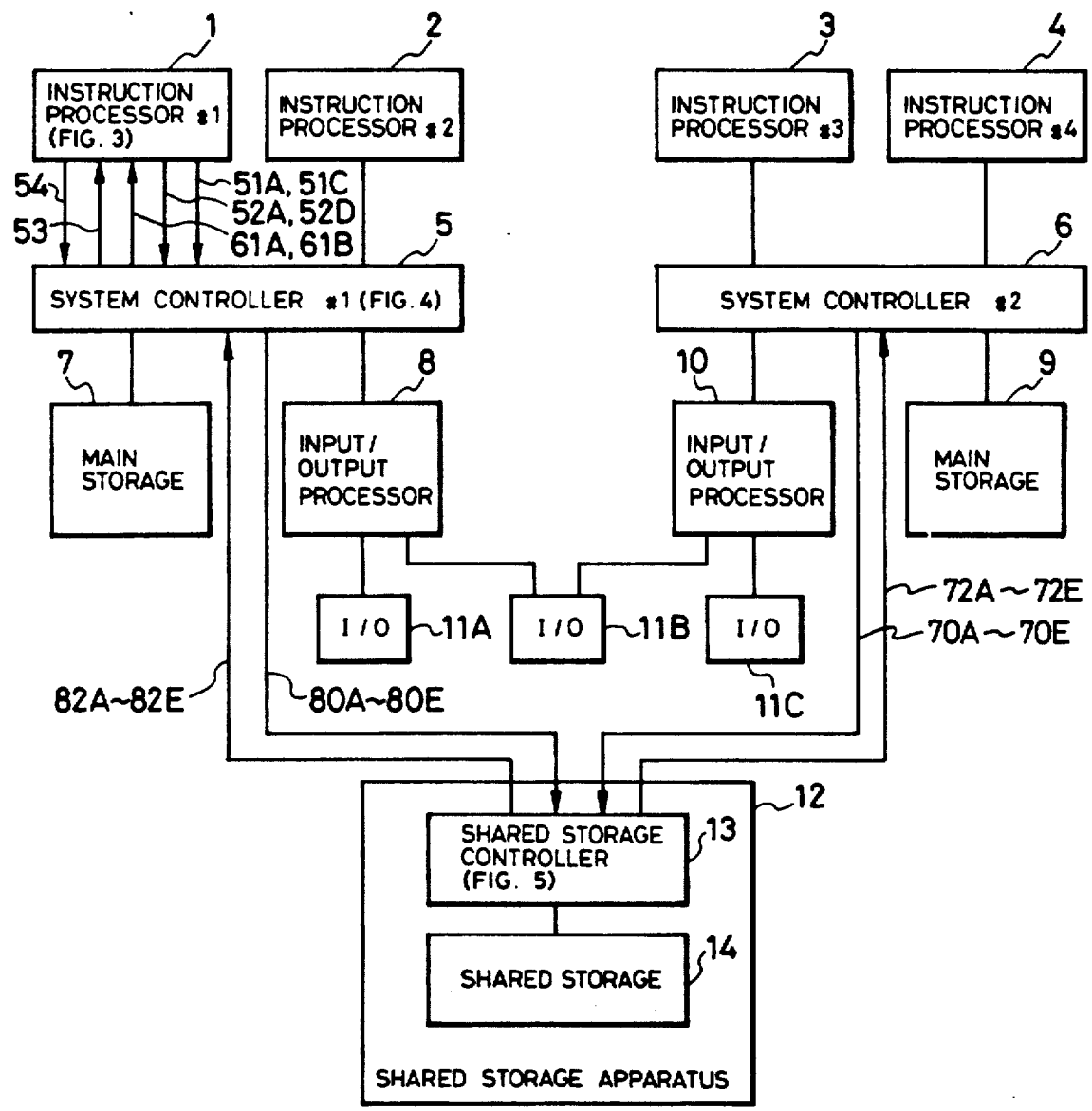
FIG. 1 is a block diagram showing the structure of a system according to one embodiment of the present invention.

Prior to the description of the embodiments of the present invention, the featured operations and actions will first be specifically described.

First of al, the aforementioned problems of the prior art are solved by storing exclusive control information for a file, information for the communications between the processor sub-systems such as file access control data and the file itself in the shared random access storage 13 (FIG. 1) of the present embodiment so that the information may be accessed by each of the processor sub-systems. Furthermore, there are provided instructions for transferring data between the main storage of each processor sub-system and the shared random access storage (14). The file access control data corresponding to (910, 911, ... (FIG. 9A)) another file which is stored in a shared sequentially accessed input/output unit 11B is also stored in the shared random access storage (14). A file access control data for a file stored either in the random access shared storage or in the shared sequentially accessed input/output unit includes a bit which indicates whether the file is in use or not. In case each processor (e.g., 1) updates the content of a file in the shared sequentially accessed input/output unit (11B), it reads the file access control data for the of its file from the shared random access storage (14), and transfers it to the main storage (7) of a sub-system to which the processor belongs. The processor (e.g. 1) decides whether an access to the file is permitted or not based upon this file access control data read out in the main storage (7) of the processor sub-system.

If the file is not in use, the processor transfers new file access control data which indicates that the file is in use, from the main storage to the shared random access storage, and the processor subsequently accesses the file within the shared sequentially accessed input/output unit; otherwise, this access the file is inhibited. In this case, the use of the file is delayed until the other processor sub-system informs of the end of use of the file through the file access control data. (When the other processor sub-system ends use of the file, it stores new file access control data which indicates that the file is not in use, in the shared random access storage.)

A problem occurs if the other processor sub-system accesses the file access control data during the time the processor processes the same file access control data. To solve this problem, the other processor sub-system is controlled so as to access the file control data only in the predetermined period such that more than one processor sub-systems cannot access the same one simultaneously. The other method is that the access of the same file control data by the other processor sub-system is inhibited during the one time the processor sub-system accesses it. Both methods could be easily realized by those skilled in the art, and a more detailed description of these will be omitted. The transfer operation between the main storage (e.g., 7) of a processor sub-system and the shared random access storage (14) is described as follows.

The instruction for transferring data between the main storage (7) and the shared random access storage apparatus (12) designates a main storage address, a transfer data length, and combination of a data identifier and a relative address both for data to be accessed. This instruction is decoded by an instruction processor, and the address of the main storage, the transfer data length, the data identifier, and the relative address are obtained by accessing general registers designated by the instruction. These values held in the registers are transferred through the system controller such that the main storage address is sent to the main storage (7), whereas the data identifier and the relative address are set to the shared random access storage apparatus (12). In case the instruction requests transfer of data from the shared random access storage apparatus (12) to the main storage (7), an access request for the shared random access storage apparatus (12) is produced by decoding that instruction and the access request is sent through the system controller (5) to the shared random access storage apparatus (12). From an operation which will be explained below for this instruction, the operation for an instruction which requests transfer of data from the main storage (7) to the shared random access storage apparatus (12) could be easily inferred by those skilled in the art, and the following description will be limited to the former instruction.

Figure 9A:
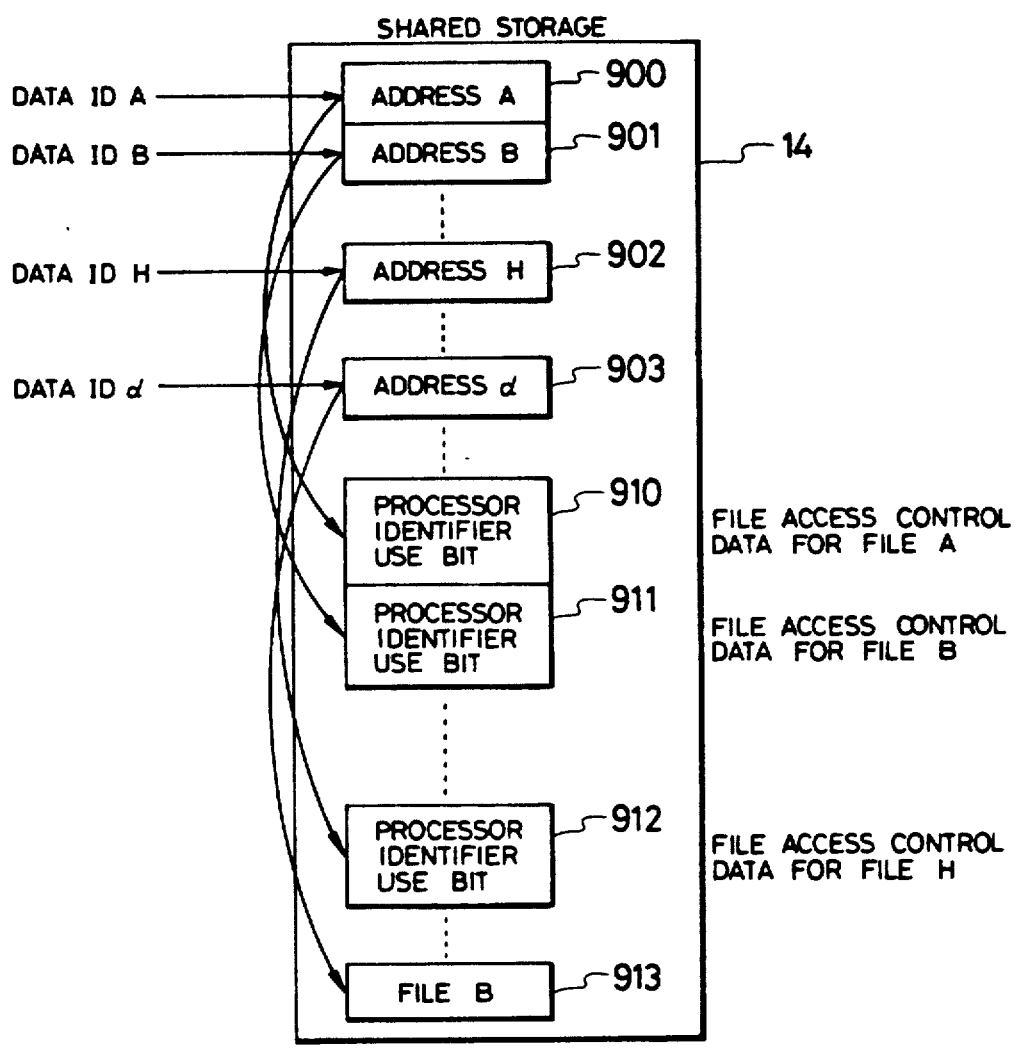
FIG. 9A is a diagram showing data stored in the shared storage.

The shared storage apparatus (12) accesses the shared storage (14) by using the data identifier sent thereto to obtain a shared storage base address (e.g., A (FIG. 9A). This shared storage base address A is added to the sent relative address to produce the shared storage address to access and fetch data from the shared storage (14). The fetched data are transferred through the system controller (5) to the instruction processor (e.g., 1). For the sent access request, on the other hand, an accept signal is sent from the shared storage apparatus (12) through the system controller (5) to the instruction processor in case the access to the shared random access storage (14) is permitted. Otherwise, the accept signal is not sent. In the case of permission, moreover, an advance signal is likewise sent through the system controller (5) to the instruction processor (1) at the instant when the necessary data are fetched from the shared random access storage (14).

In response to the access request from the shared storage apparatus (12), the instruction processor (1) updates the held relative address by a fixed value. This fixed value is a data length, such as 8 bytes, of data which is sent by one time from the shared storage apparatus (12). The transfer data length designated by the instruction is held in both a fetch data length counter (108 (FIG. 3)) and a write data length counter (111 (FIG. 3)) when the instruction is decoded. In response to the accept from the shared storage apparatus (12), the held value of the read data length counter 108 is decremented by a fixed value. This fixed value is identical to that which has been used in order to increment the aforementioned relative address. In response to the accept signal from the shared storage apparatus (12), a shared storage access requester in the instruction processor produces a next shared storage access request. Production of this request is repeated until the held content of the read data length counter becomes smaller than the fixed value (e.g., 8).

In response to the advance signal from the shared storage apparatus, a main storage requester in the instruction processor produces a main storage access request. In response to this main storage access request, the held value of the write data length counter (111) is decremented by a fixed value. Generation of this main storage access request is repeated until the held content of the write data length counter (111) becomes smaller than the fixed value.

The data sent from the shared storage apparatus (12) are sent from the instruction processor (1) through the system controller (5) to the main storage (7) in synchronism with the main storage access request.

The foregoing and other objects, advantages, manner of operation and novel features of the present invention will be understood from the following detailed description when read in connection with the accompanying drawings.

One embodiment of the present invention will be described in the following with reference to the accompanying drawings.

Figure 2:
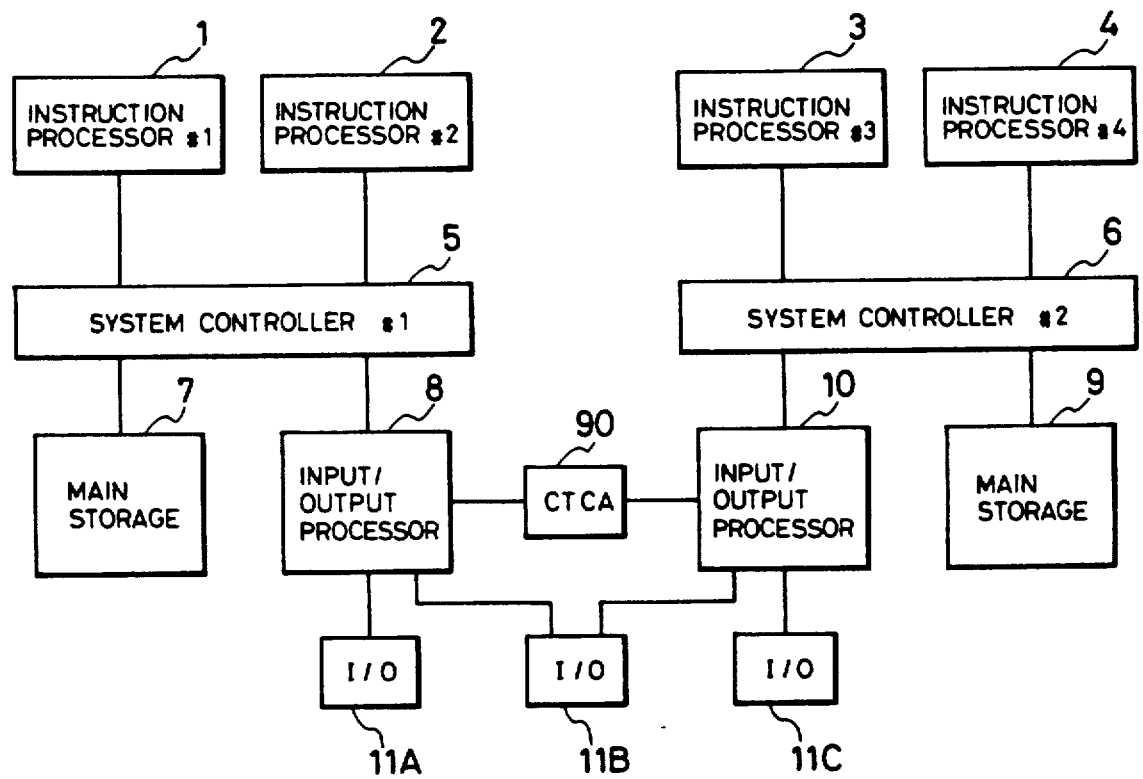
FIG. 2 is a block diagram showing the structure of a system for illustrating the prior art.
Figure 9B:
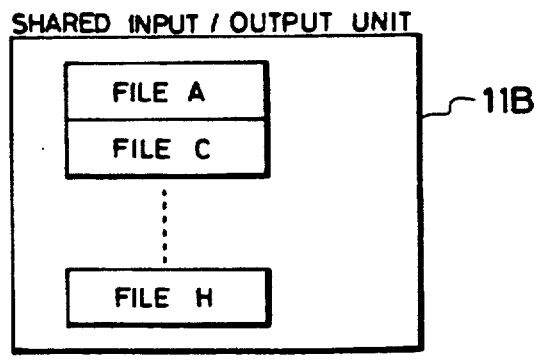
FIG. 9B is a diagram showing data stored in the shared input/output storage.

FIG. 1 is a block diagram showing the structure of a system according to the embodiment of the present invention. In FIG. 1: reference numerals 1 to 4 designate instruction processors #1, #2, #3 and #4, respectively; numerals 5 and 6 system controllers #1 and #2; numerals 7 and 9 main storages; numerals 8 and 10 input/output processors; numerals 11A and 11C non-shared sequentially accessed input/output units; numeral 11B a shared sequentially accessed input/output unit (or DADD); and numeral 12 a shared storage apparatus. Like FIG. 2, the instruction processor #1, the instruction processor #2, the system controller #1, the main storage 7 and the input/output processor 8 from a processor sub-system constituting a tightly coupled multi-processor structure. The instruction processor #3, the instruction processor #4, the system controller #2, the main storage 9, the input/output processor 10 forms another processor sub-system constituting a tightly coupled multi-processor structure. These two processor sub-systems constitute together a loosely coupled multi-processor system coupled through the shared storage apparatus 12 and the shared DASD 11B. The system structure of FIG. 1 is equipped with the shared storage apparatus 12 in place of a CTCA, as is different from the structure of FIG. 2. Some files are held in the shared input/output unit 11B, as shown in FIG. 9B, while other fields like file B are held in the shared random access storage 14, as shown in FIG. 9A. A group of file access control data 910-912 corresponding to these files and the heading addresses of their locations 900-902 are stored in the shared random access storage 14 as shown in FIG. 9A. The file access control data for a file includes a processor identifier for a processor which is using the file and a bit which indicates whether the file is in use or not.

In case each processor updates the content of a file (e.g., A) held in the shared input/output unit, it reads the file access control data for the file from the shared random access or storage 14. This can be done by using a transfer instruction for transferring the file access control data from the shared random access storage to the main storage connected to the processor.

A data identifier designated by the instruction indicates a location which holds a heading address of one file control data (e.g., 910) for the file among a group of file access control data 910-912 in the shared random access storage. A relative address designated by the instruction is zero.

An address of a location within the shared random access storage 14 is generated by the shared storage controller 13, by adding the relative address (0) to the heading address held in the location designated by the data ID. Therefore, one need not change the instruction even if the one file access control data is located anywhere in the shared random access memory storage. (The instruction indicates the file access control data by using the data identifier and the relative address.) The processor decides whether access to the file is permitted or not based upon this file access control read out data in the main storage connected to the processor.

If the file is not in use, the processor transfers the file access control data which indicates that the file is in use from the main storage to the shared random access storage, and the processor subsequently accesses the shared input/output unit 11B.

Otherwise, this access is inhibited. In this case, of the use of the file by the processor is delayed until the other processor sub-system informs the end of use of the file through the file access control data. (When it ends of use of the file, it stores new file access control data which indicates that the file is not in use in the shared storage.) The processor accesses the file access control data only in the predetermined period such that more than one processor sub-system cannot access the same one simultaneously. The data transfer operation between the main storage (7) and the shared random access storage is described as follows.

Figure 3:
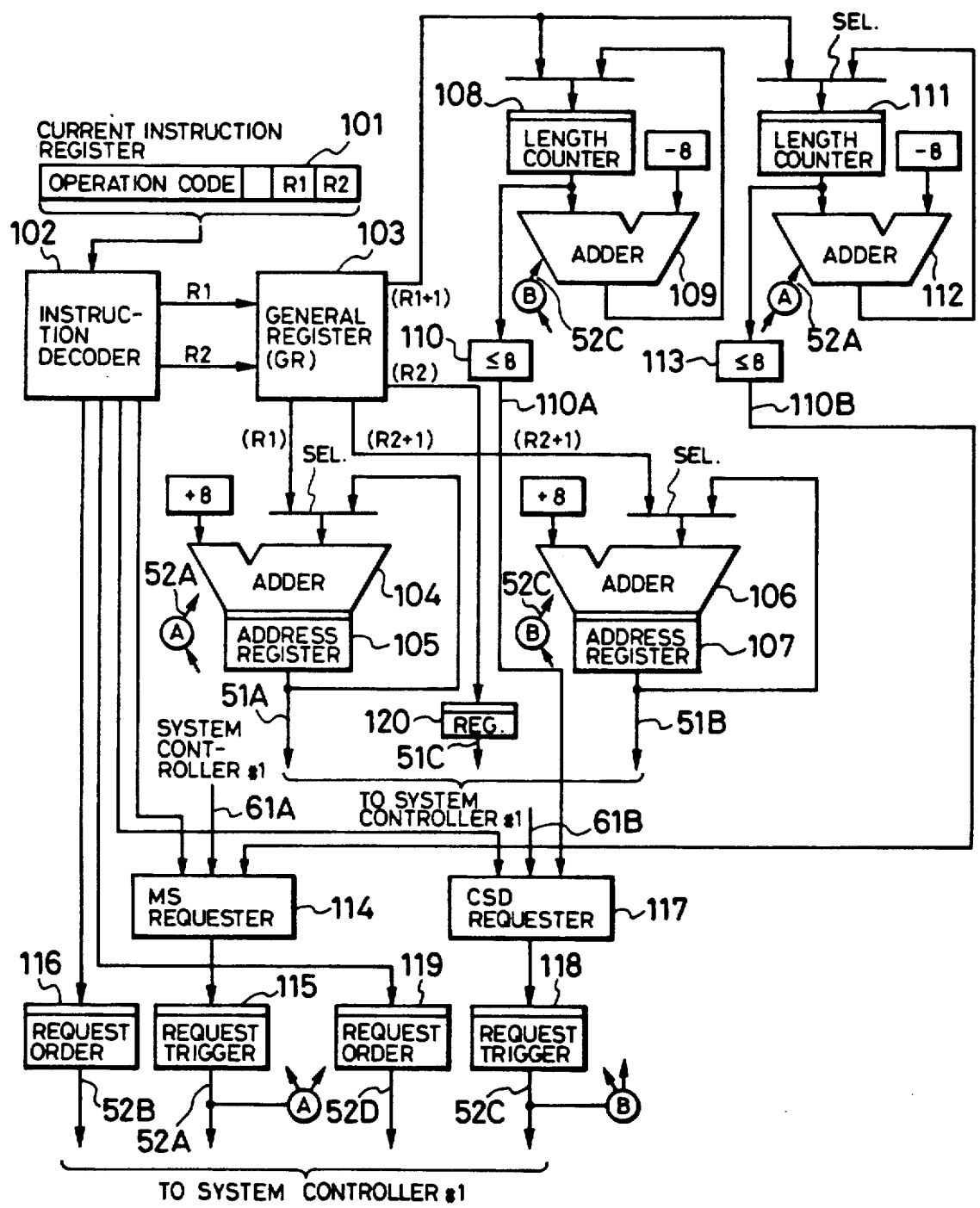
FIG. 3 is a circuit diagram showing an instruction processor of FIG. 1.

When a transfer instruction which requests transfer of data from the shared storage apparatus 12 to the main storage is fetched to a current instruction register 101 of FIG. 3, general register numbers R1 and R2 designated by the instruction are set by an instruction decoder 102 to general registers (GR) 103. The content of a general register of a register number R1, within the GR 103 is initialized as it is in an address register 105 through an adder 104. The content of the address register 105 indicates the main storage address of a location at which data is to be stored, as shown in FIG. 6. The content of a general register of a register number R1+1, within the GR103 is initialized in both a fetch data length register 108 and a write data length register 111. This value indicates the length of data to be transferred, as shown in FIG. 6. The content of a general register of a registered number R2, within the GR103 is set in a register 120. As shown in FIG. 6, the content of the register 120 indicates a data identifier and is sent through a line 51C to the system controller #1. The content of a general register of a register number (R2+1), within the GR103 is initialized as it is in an address register 107 through an adder 106. The content of the address register 107 indicates the shared storage relative address for a location from which data is to be as shown in FIG. 6. The content of the address register 107 is sent through a line 51B to the system controller #1.

If the instruction of FIG. 6 is recognized by the instruction decoder 103, on the other hand, a CSD (shared storage) requester 117 produces a shared storage access request, which is set in a request trigger 118. The content of the request trigger 118 is sent through a line 52C to the system controller #1. Likewise, the information expressing the fetch it set in a request order 119 by the instruction decoder 102 and sent through a line 52D to the system controller #1.

The content of the fetch data length register 108 is determined by a circuit 110 whether or not it is smaller than a fixed value (8). The result of determination is sent through a line 110A to the CSD requester 117. If it is recognized by a circuit 113 that the content is smaller than 8, the CSD requester 117 inhibits generation of subsequent shared storage access requests.

The request trigger 118, if set, is sent through the line 52C to the adder 109 and 106. In response to the line 52C, the adder 109 updates the value of the fetch data length register 108 by a fixed value (e.g., −8) and sets the results in the fetch data length register 108. In response to the line 52C, the adder 106 updates the value of the address register 107 by a fixed value (8) and sets the result in the address register 107. Operations of the system controller #1 will be explained below by referring to FIG. 4.

Figure 4:
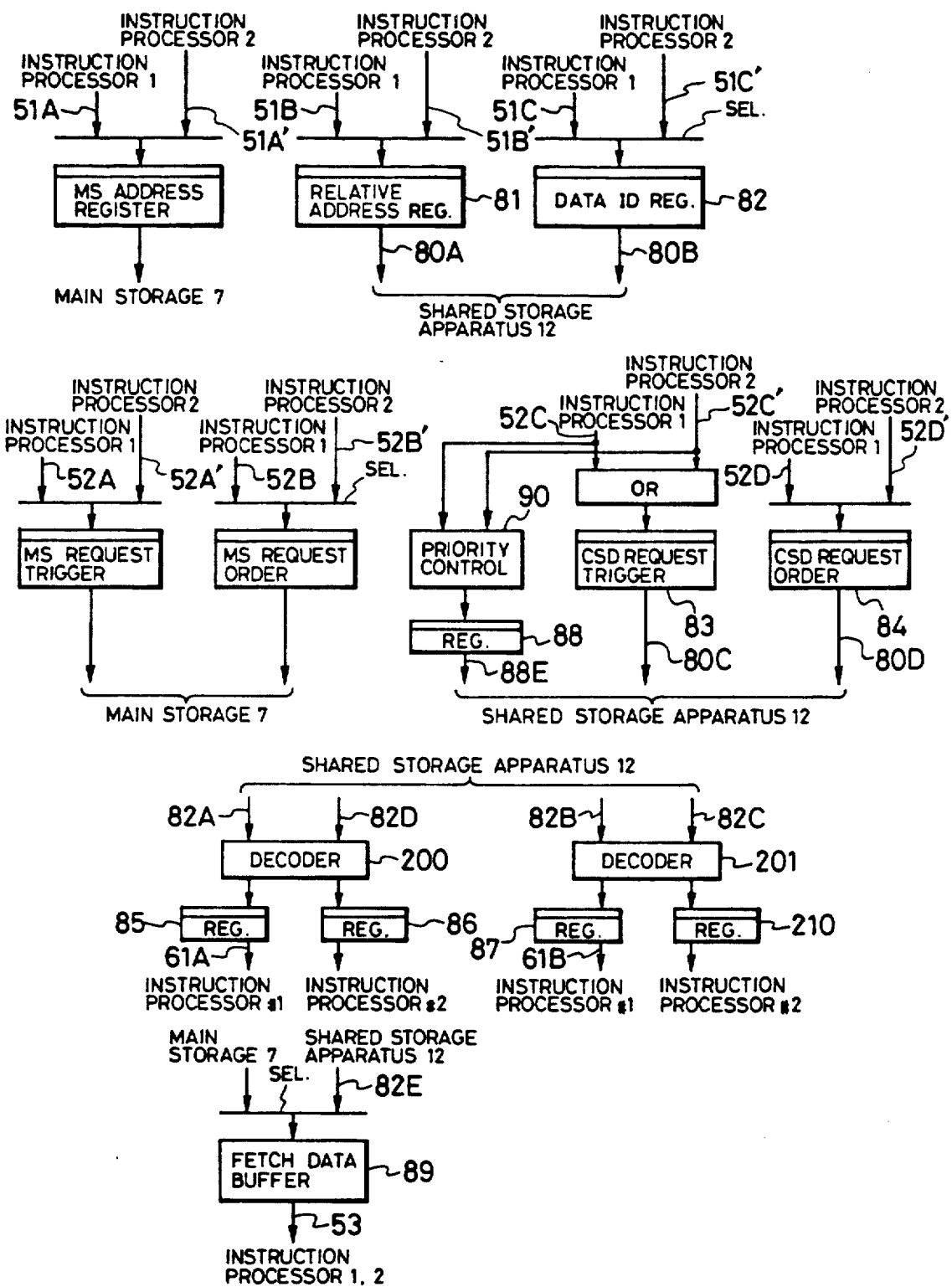
FIG. 4 is a circuit diagram showing a system controller of FIG. 1.

An OR is taken between the request trigger sent through the line 52C from the instruction processor #1 and the request trigger sent from the instruction processor #2 and is set in a CSD request trigger register 83 (FIG. 4) until it is sent through within a line 80C to the shared storage apparatus 12. One of the relative addresses within the address register 107 sent through the line 51B from the instruction processor #1 and a relative address signal coming from the instruction processor #2 is selected, as shown in FIG. 4, by a selector in the system controller #1 and is set in an address register 81 (FIG. 4) until it is sent through a line 80A to the shared storage apparatus 12. Since the instruction processor #2 is identical to the instruction processor #1, it has a line corresponding to the line 51B, and one of its two liens is selected. Likewise, the instruction processor #2 also has lines corresponding to the lines 51C, mentioned below 52C and 52DC also mentioned below.

One of the data identifier sent through the line 51C from the instruction processor #1 and a data identifier sent via a corresponding line from the instruction processor #2, and is selected within the system controller #1 by a selector and is sent to the data ID register 82 until it is sent through a line 80B to the shared storage apparatus 12. Likewise, one of the request order sent through the line 52D from the instruction processor #1 and a request order sent through a corresponding line from the instruction processor #2 is selected within the system controller #1 by a selector, and is set in a CSD request order register 84 until it is sent through a line 80D to be shared storage apparatus 12. A priority control 90 determines which of the instruction processors #1 and #2 should be selected, and controls selectors connected to inputs of the address register 81, a data ID register 82, the CSD request trigger register 83 and the CSD request order register 84 so that signals from the selected instruction processor are selected by these selectors. The number of selected instruction processor is sent in a latch 88 by the priority control 90 and is sent through a line 80E to the shared storage apparatus 12. Operations of the shared storage controller 13 will be explained below, by referring to FIG. 5.

Figure 5:
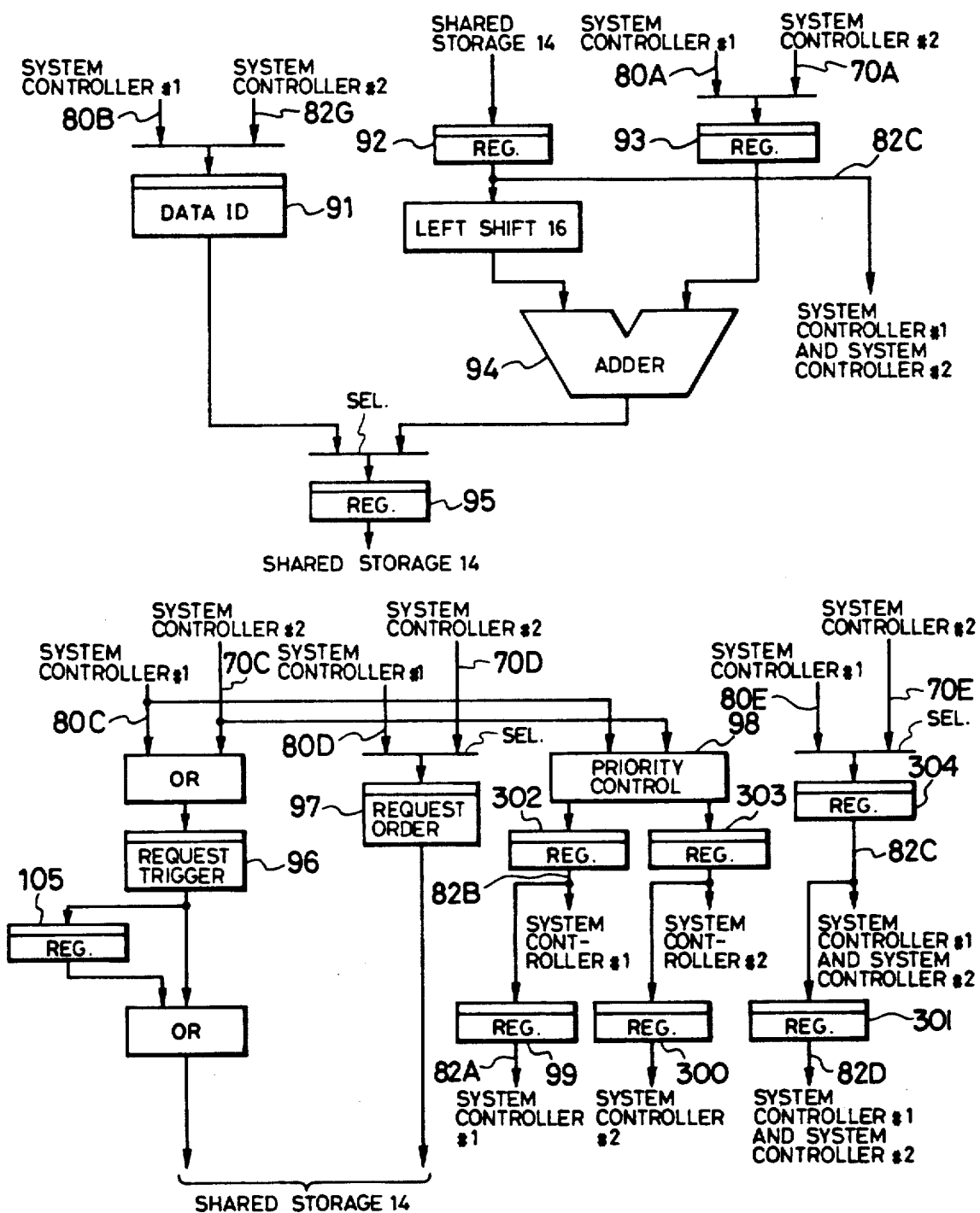
FIG. 5 is a circuit diagram showing a shared storage controller of FIG. 1.

The CSD request trigger sent through the line 80C from the system controller #1 is provided to a priority control 98 which also receives a corresponding signal given via line 70C from the system controller #2, as shown in FIG. 5, and the priority control 98 determines which one of the system controllers #1 and #2 should be selected. A trigger is set in the latch 302, in case the system controller #1 is selected, and in the latch 303 in case the system controller #2 is selected until the trigger set in either one of the registers 102 and 103 is sent to the system controllers #1 or #2, respectively. OR is taken of the triggers given by the system controller #1 and #2, and a result is stored in the request trigger register 96.

Likewise, the CSD request order and the instruction processor number sent through the lines 80D and 80E from the system controller #1 receive select operations within the shared storage controller 13 by selectors which also receive corresponding signals from the system controller #2 and set in a request order register 97 and the latch 304 until they are sent to a shared storage 14 and the system controller #1 or #2, respectively.

Likewise, the relative address and the data ID sent through the lines 80A and 80B from the system controller #1 receive select operations by selectors which also receive the corresponding signals from the system controller #2 and are set in register 93 and 91.

The data ID within the register 91 is set through a selector to a register 95 until it is used to access the shared storage 14.

The shared storage (CSD) address for data to be fetched therefrom is obtained from the relative address and the data ID by the procedures shown in FIG. 8. The procedures are as follows. The CSD base address 500 is fetched from a location within the shared storage 14 having an address determined by the data ID provided via the register 95 from the register 91 (FIG. 5). The memory access is initiated by a trigger and a request order respectively held in the request trigger 96 and the request order trigger 97 and the fetched base address 500 is set in a register 92 and are added to the relative address within the register 93 by the adder 14, after being shifted by a necessary amount (in this case a 16 bit leftward shift). The sum is a CSD absolute address 501 required and is set in the register 95 until it is sent to the shared storage 14 to read data 502 to be transferred. The request trigger is delayed by the latch 305 until the instant when the aforementioned addition is completed, and the latch 105 sends the delayed trigger to the shared storage 14. This shared storage 14 sets the fetched data 502 in the register 92 and sends them through a line 82C to the system controllers #1 or #2.

The contents of the latches 302, 303 and 304 are delayed by the latches 99, 300 and 301, respectively, until the fetched data are sent to the system controller #1 or #2 and thereafter they are sent to the system controller #1 or #2.

The content of the latch 302 implying that the request of the system controller #1 has been selected and the number of the selected instruction processor held in the register 104 are sent to a decoder 201 of FIG. 4 through a line 82B and the line 82C, respectively, and the decoder 201 set on accept signal to the instruction processors #1 or #2, respectively into registers 87 and 210, until the signal is sent to the instruction processors #1 or #2.

If the instruction processor #1 receives the accept signal through a line 61B, the CSD requester 117 produces a next shared storage access request and sets it in the request trigger 118. If this request trigger 118 is set, the aforementioned operations are repeated so that the requests are kept produced until the circuit 113 recognizes that a data length for data to be fetched is less than the fixed value (8).

The content of a latch 99 implying that the shared storage data have been sent to the system controller #1 and the instruction processor number held in the register 101 at this time are set to a decoder 200 of FIG. 4 through a line 82A and 82D, respectively, and the decoder 200 sets an advance signal to the instruction processor #1 or an advance signal to the instruction processor #2, respectively, in a latch 85 or a latch 86 until either one of the signals sent to the instruction processors #1 or #2, respectively.

If the instruction processor #1 receives the advance signal through a line 61A from the register 85, an MS requester 114 FIG. 3 produces a request to the main storage 7 and sets it in a request trigger register 115. The instruction decoder 102 sets information indicating a write operation to the main storage in a request order register 116, at decoding of the instruction under discussion. The request trigger 115 and the request order 116 are sent through lines 52A and 52B to the system controller #1.

The request trigger 115, it set, is sent through the line 52A to the adders 112 and 104. In response to the line 52A, the adder 112 updates the value of the write data length register 111 by a fixed value and sets the result in the write data length register 111. Likewise, in response to the line 52A, the adder 104 updates the value of the address register 105 by a fixed value and sets the result in the address register 105.

The content of the write data length register 111 is determined by the circuit 113 whether or not it is smaller than the fixed value (8). The result is sent through the line 110B to the MS requester 114. If it is recognized by the circuit 113 that the content is smaller than the fixed value 8, the MS requester 114 inhibits generation of the subsequent main storage access requests.

The data fetched from the shared storage apparatus 12 are sent through a line 82E to a fetch data buffer 89 of FIG. 4 and further through a line 53 to the instruction processors #1 or #2. The data sent through the line 53 to the instruction processor #1 or #2 is processed by them in a well known manner until they are sent as the write data to the main storage 7 to the system controller #1.

The request and order to the main storage 7 are sent through the lines 52A and 52B to the system controller #1 so that they are written to the main storage 7 from the system controller #1 by the well known technique.

FIG. 7 is a diagram showing a format of the transfer instruction which requests transfer of data from the main storage to the shared storage apparatus 14. The operations in this case could be inferred by those skilled in the art, and their descriptions will be omitted. As mentioned at the beginning of the description of the embodiment, a file itself such as file B shown in FIG. 9A can be stored in the shared storage 14. In this case, the data identifier designated by the instruction represents the file identifier, and indicates the location (e.g. 903 in the FIG. 9) in which the heading address of the file (913 in the FIG. 9) is stored. The transfer operation between the main storage and the shared storage 14 is the same as has been described hereinbefore.

As has been described hereinbefore, according to the present invention, the exclusive controls and the communications between the processors can be processed at a high speed by storing the exclusive control information and the information on the processor-to-processor communications in the shared storage apparatus so that the shared storage apparatus may be accessed by using the instructions for transferring data between the main storages of the individual processor sub-systems and the shared storage apparatus. Although about 3,000 instructions have to be processed in the case of the start I/O instruction, the transfer instructions for transferring data between the main storages and the shared storage apparatus of the present invention can be highly effectively processed for a time period corresponding to that for 20 to 50 instructions.

What is claimed is:
1. A multiprocessor system comprising:
 (a) a plurality of loosely-coupled subsystems, each of said subsystems including a main storage device and at least one processor connected to said main storage device;
 (b) a shared random access storage device for holding groups of data each accessible by the plurality of subsystems;
 (c) first address means responsive to a field of a data transfer instruction which is executed by one of the subsystems and requires transfer of one datum within one data group among the data groups stored in said shared random access storage device between said shared random access storage device and said main storage device of said one subsystem, for generating a real address of a location within said shared random access storage device for the one datum within the one data group, based upon both a data group identifier indicated by said data transfer instruction indicative of the one data group and a relative address within the one data group, designated by said data transfer instruction for the one datum;
 (d) second address means provided in correspondence to said one subsystem and responsive to another field of the data transfer instruction for generating a main storage address of said main storage of said one subsystem; and
 (e) data transfer means connected to said first and second address means, said main storage of each subsystem and said shared random access storage device, and responsive to said data transfer instruction for transferring said one datum between said shared random access storage device and said main storage device of said one subsystem, based upon the generated real address of said shared random access storage device and said main storage address.

2. A multiprocessor system according to claim 1, wherein the one data group includes a group of control data for use in controlling an access to file data of one of a plurality of files shared by the subsystems.

3. A multiprocessor system according to claim 1, wherein the one data group includes file data of one of a plurality of files shared by the subsystems.

4. A multiprocessor system according to claim 1, wherein the instruction designates registers which are provided in said processor within said one subsystem and which hold the data group identifier and the relative address, respectively.

5. A multiprocessor system according to claim 1, wherein said first address means includes means responsive to the data group identifier for reading a base address from said shared storage device and for generating the real address for the one datum, based upon the base address and the relative address.

6. A multiprocessor according to claim 1, wherein said first address means is provided in common to said subsystems, so that said address means responds to a data transfer instruction executed by any one of the subsystems.

7. A multiprocessor according to claim 6, wherein said second address means comprises a plurality of address means each provided for a corresponding one of the subsystems and each responsive to a data transfer instruction executed by said processor of a corresponding subsystem for generating a main storage address of said main storage within said corresponding subsystem.

8. A multiprocessor system comprising:
 (a) a plurality of loosely-coupled subsystems, each of said subsystems including a main storage device and at least one processor connected to said main storage device;

(b) an input/output device connected to said subsystems for holding a plurality of files shared by said subsystems;

(c) a shared random access storage device connected to said subsystems for holding file access control data which is provided for each of the files and which is for use in exclusively controlling access by said subsystems to each of said files;

(d) address means responsive to information designated by a data transfer instruction executed by one of said subsystems before one of the files is to be accessed thereby for generating an address of a storage location within said shared random access storage device and a main storage address within said main storage device of the one subsystem, the storage location within said shared random access storage device holding one file access control datum for one of the files held by said input/output device; and (e) data transfer means connected to said address means, said main storage of each subsystem and said shared random access storage device, for transferring said one file access control datum between said shared random access storage device and said main storage device of said one subsystem, based upon the generated address of said shared random access storage device and said main storage address.

9. A multiprocessor system according to claim 8, wherein the information designated by the instruction includes a data group identifier for the file access control data and a relative address, as address information, and said address means includes means for generating the address of the storage location within said shared random access storage device in response to the data identifier and the relative address.

10. A multiprocessor system according to claim 9, wherein said address means includes means responsive to the data identifier for reading a base address from said shared random access storage device; and means for generating the address of the storage location within said shared random access storage device based upon the base address and the relative address.

11. A multiprocessor system according to claim 9, wherein the instruction designates registers which are provided within said processor within said one subsystem and which hold the data group identifier and the relative address, respectively.

12. A computer system comprising:

(a) a processor coupled to a main storage device;

(b) a random access storage loosely coupled to said processor for storing groups of data;

(c) first address means responsive to a field of a data transfer instruction which requires transfer, between said random access storage and said main storage device, of one datum within one data group among the data groups, for generating a real address within said random access storage for the one datum based upon a data group identifier designated by the data transfer instruction and indicative of the one data group and a relative address designated by the data transfer instruction and indicative of one datum among the one data group;

(d) second address means responsive to another field of the data transfer instruction for generating a main storage address of said main storage;

(e) data transfer means connected to said first and second address means, said main storage and said random access storage, for transferring said one datum between said random access storage and said main storage, based upon the generated real address and said main storage address; and means responsive to said data transfer instruction for sequentially generating plural relative addresses for plural data succeeding the one datum in response to a total length of data to be transferred, as designated by the data transfer instruction, and for sequentially supplying said first address means with plural pairs which each comprise the designated data group identifier and one of the generated plural relative addresses so that real addresses for the plural succeeding data within the one data group are generated by said first address means so as to enable said data transfer means to transfer the plural succeeding data.

13. A computer system according to claim 12, wherein said address means includes means for generating the real address of the one datum from the data ID and the relative address respectively held in registers designated by the instruction.

14. A computer system according to claim 12, wherein the one data group is file data and the data group identifier is a file identifier for the file data.

15. A computer system according to claim 12, wherein said first address means is provided at a location near the random access storage and outside of a processor of the computer system.

16. A computer system according to claim 15, wherein the second address means is provided in the processor.

17. A data processing system comprising:

(a) a plurality of loosely-coupled subsystems each including at least one processor and a main storage device connected to said at least one processor;

(b) a random access storage device shared by said subsystems for storing files each accessible by all of said plurality of subsystems and file access control data provided for each file and used for exclusively controlling access to each file by said subsystems;

(c) address means responsive to first information designated by an instruction executed by said at least one processor within one of the subsystems for producing a main storage address of a location in the main storage device of the one subsystem and responsive to second information designated by said instruction for producing a random access storage address of a location of said shared storage device, the location of said shared storage device holding either one file access control datum for one of the files or one datum belonging to the one file; and (d) data transfer means connected to respond to the main storage address and the random access storage address for transferring the one file access control datum or the one datum between the location of the main storage device and the location of the shared storage device.

18. A data processing system according to claim 17, wherein the information designated by the instruction includes a data group identifier and a relative address, as address information for the one file control datum or the one datum, and the address means includes means responsive to the data group identifier and the relative address for producing the random access storage address.

19. A data processing system according to claim 18, wherein the instruction designates registers which are provided in said one subsystem and which hold the data identifier and the relative address, respectively.

20. A data processing system according to claim 18, wherein the address means includes means responsive to the data group identifier designated by the instruction for reading a base address held in said shared storage device for said one file control datum or for the one file and for producing the random access storage address based upon the base address and the relative address.

* * * * *